United States Patent [19]

Kervagoret

[11] 4,204,817

[45] May 27, 1980

[54] TORQUE-AMPLIFYING HYDRAULIC SERVO-MECHANISM, PARTICULARLY FOR POWER STEERING SYSTEMS IN MOTOR VEHICLES

[75] Inventor: Gilbert Kervagoret, Argenteuil, France

[73] Assignee: Societe Anonyme D.B.A., Paris, France

[21] Appl. No.: 973,496

[22] Filed: Dec. 26, 1978

[51] Int. Cl.² .............................................. F01C 1/00
[52] U.S. Cl. .................................. 418/248; 418/270; 91/375 A; 60/401; 60/493
[58] Field of Search ..................... 418/248, 270, 61 B; 91/375 A; 60/384, 388, 401, 403, 493

[56] References Cited

U.S. PATENT DOCUMENTS

| | | | |
|---|---|---|---|
| 4,115,045 | 9/1978 | Wyman | 418/248 X |
| 4,137,989 | 2/1979 | Rehfeld | 418/248X |

Primary Examiner—Edgar W. Geoghegan
Attorney, Agent, or Firm—Paul David Schoenle; Ken C. Decker

[57] ABSTRACT

A torque-amplifying hydraulic servo-mechanism of the kind including a rotary hydraulic motor and a hydraulic distributor, said motor being of the sliding vane type and the distributor of the "face", open center type. According to the invention, the rotor (50) of the hydraulic motor includes two diametrically opposite cylindrical surfaces (90) in contact with the stator bore and each extending over an arc equal to that between two adjacent vanes (24), and two interconnecting portions each having two flat faces (106, 108) interconnected by a cylindrical surface portion (104); and the number of vanes (94) is advantageously four times the number of said surfaces (90), that is eight. The servo-mechanism thus designed may be advantageously used in power steering systems for motor vehicles, and produces an output torque substantially constant irrespective of the relative position of the rotor and stator of the hydraulic motor.

6 Claims, 5 Drawing Figures

FIG._3

TORQUE-AMPLIFYING HYDRAULIC SERVO-MECHANISM, PARTICULARLY FOR POWER STEERING SYSTEMS IN MOTOR VEHICLES

The invention relates to a torque-amplifying hydraulic servo-mechanism, particularly for power steering systems in motor vehicles, and more specifically to a servomechanism of the kind comprising a rotary hydraulic motor and a hydraulic distributor coaxially mounted inside a common closed casing, an input shaft connected to a component of the hydraulic distributor, an output shaft connected to the rotary component of the hydraulic motor, and a resilient coupling disposed between the shafts in order to produce a feedback torque on the input shaft so as to indicate the amplified torque delivered to the output shaft, the hydraulic distributor being of the "open centre" kind and controlling the distribution of pressure fluid in the working chambers of the hydraulic motor so as to actuate it in one or the other direction when, and depending on the direction in which, the input shaft is moved through an angle with respect to the output shaft.

A hydraulic servo-mechanism of the aforementioned kind for power steering systems is known, e.g. from French Patent Spec. No. 2 007 045. In an embodiment shown in FIGS. 10 and 11 of the cited patent, the known servo-mechanism comprises a distributor including a valve spool moving axially when actuated by the input shaft, and a rotary hydraulic motor having vanes and an eccentric rotor. The eccentricity is necessary for defining the working chambers of the hydraulic motor, but has a disadvantage in that the output torque delivered by the system is not constant for a given input order. An additional disadvantage of the known servo-mechanism is its relative length, due inter alia to the use of a distributor comprising a sliding valve spool.

An object of the invention is to obviate the disadvantages of the prior art, and more specifically to design a hydraulic servo-mechanism capable of delivering a constant output torque, independent of the rotor position, for a given input order, the torque varying very gradually and only as a function of the input order, provided the device has a constant supply of pressure fluid. The servo-mechanism must also be very compact and economic.

To achieve this object, the invention makes use of a hydraulic motor of the sliding vane type comprising two coaxial components namely a stator of cylindrical shape which bears angularly equidistant radially sliding vanes and a rotor whose non-circular shape is designed so as to define with said stator and said vanes a number of variable volume working chambers, and more specifically proposes that the shape of the rotor of the hydraulic motor comprise at least two angularly equidistant cylindrical surfaces in contact with the stator bore and each extending over an arc substantially equal to that between two adjacent vanes, these surfaces being interconnected by portions of contour each having two flat or slightly curved faces interconnected by a cylindrical surface portion and bounding a corresponding number of separate compartments with the stator bore, and that the number of vanes be four times the number of said surfaces and portions of rotor contour so as to subdivide each compartment, depending on the position of the rotor, either into four working chambers, the first two of which can be supplied with high-pressure fluid and the last two with low-pressure fluid or vice versa by actuating the distributor, or into three working chambers the first of which can be supplied with high-pressure fluid and the last with low-pressure fluid or vice versa by operating the distributor, whereas the central chamber is at an intermediate pressure.

As shown in the following description, the above defined embodiment of the hydraulic motor ensures that an extremely uniform torque is delivered at the servo-mechanism outlet irrespective of the position of the rotor.

In a preferred embodiment of the invention, the hydraulic distributor is of the "face" kind and comprises a plate rotating integrally with the input shaft and having a number of supply chambers on its active surface, said number of supply chambers being twice the number of rotor surfaces and the chambers being connected to a source of fluid at a substantially constant flow rate, and an identical number of exhaust chambers connected to the return of the source and alternating with the supply chambers, and further comprises a disc secured to the rotor of the hydraulic motor and disposed between and continuous with the latter and the aforementioned plate, the surface of the disc adjacent the plate being provided with an equal number of symmetrically distributed intermediate chambers each communicating by variable partial overlap with a supply cham-and an exhaust chamber of the plate, and the disc surface adjacent the rotor bears a similar number of angularly equidistant flow chambers each connected to one of the intermediate chambers and opening into the hydraulic motor substantially at the level of the aforementioned compartments in order to supply them with fluid under pressure. This construction of the hydraulic distributor has the advantage of helping to reduce the bulk, i.e. length, of the servo-mechanism.

In an embodiment of the distributor, the supply chambers comprise radial grooves formed in the plate and opening only on to its active surface, the exhaust chambers comprise radial grooves also formed in the plate and opening both on to its active surface and its periphery, the intermediate chambers comprise substantially circular sectors formed in a surface of the disc, the radial edges of which cooperate with two of the aforementioned grooves to bound the variable overlapping apertures, and the flow chambers are substantially crescent-shaped and are formed in the surface of the disc adjacent the rotor and each connected by a passage to one of the intermediate chambers, the average diameter of the crescents being substantially equal to the diameter of the stator bore of the hydraulic motor. In another advantageous embodiment, each radial edge of the intermediate chambers is laterally prolonged by a cylinder portion which in turn is prolonged by a cylinder portion having a smaller radius, so that the flow section offered to the fluid at the overlaps varies progressively as a function of the relative angular position of the plate and the disc. The advantage of this feature is that the output torque can be very gradually varied as a function of the input torque.

The invention will now be described in greater detail with reference to a preferred embodiment, given by way of illustrative example, and with reference to the accompanying drawings in which.

Figure 1:
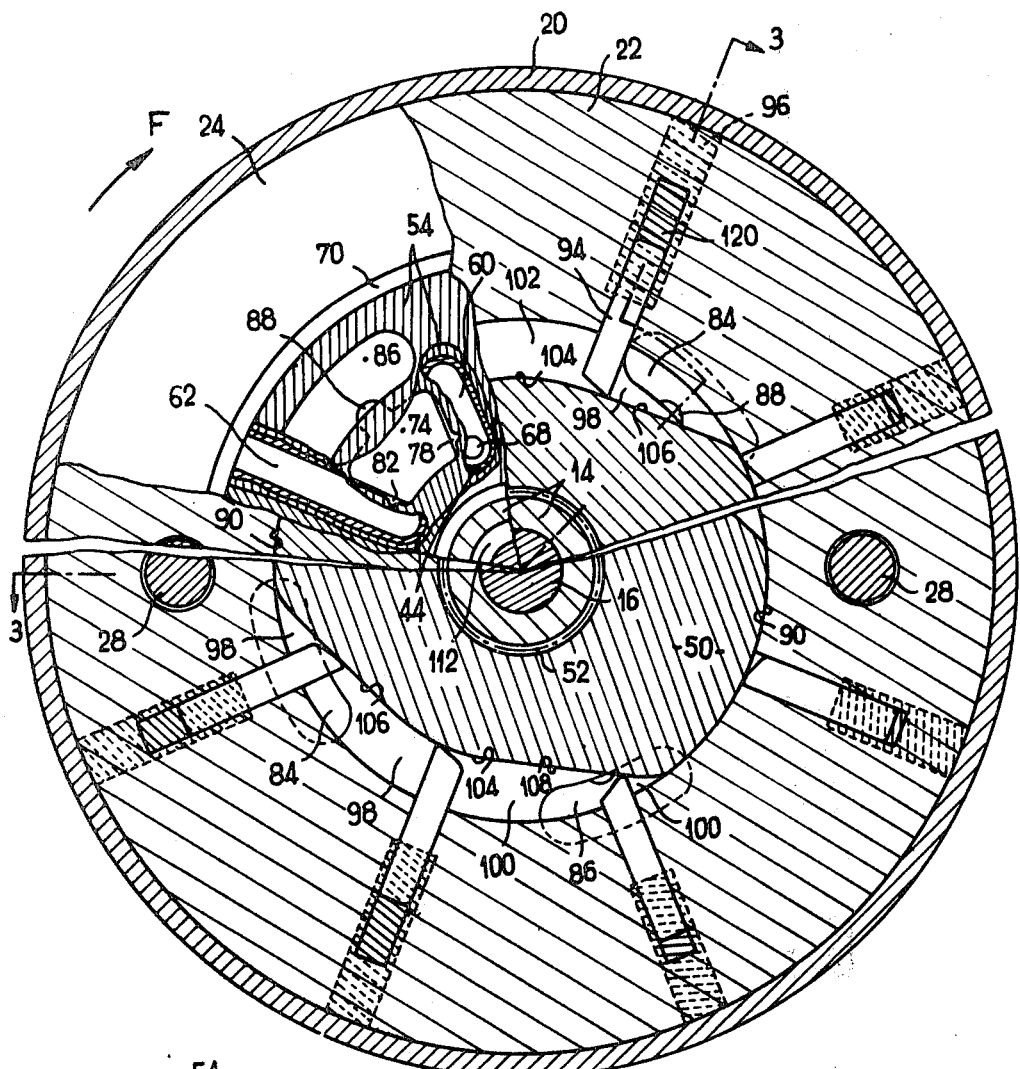
FIG. 1 is a cross-section along arrow 1 of FIG. 3 of a hydraulic servo-mechanism according to the invention, the bottom part of FIG. 1 showing the hydraulic rotor in any position and the top part showing the rotor in a particular position, the top part comprising a partial, cut-away view.

The drawings show a torque-amplifying hydraulic servo-mechanism 10, particularly for power steering systems in motor vehicles, comprising an input shaft 12 in line with an output shaft 14, which shafts are interconnected by a torsion bar 16 extending through a sealing-tight closed casing 18. Casing 18 comprises a collar 20 holding a ring 22, a first shell 24 and a second shell 26. Casing 18 is secured together by two screws or bolts 28. Shell 24 has a stepped bore 30 having a part 32 for centering the input shaft 12 and having a shoulder 34 which receives a needle bearing 36 which axially positions the input shaft 12. Its end face 38 cooperates with ring 22. Shell 24 also has an orifice 40 connected to a source of fluid at a substantially constant flow rate and opening into bore 30, and an orifice 42 connected to the tank of the constant flow-rate source of fluid and opening between shoulder 34 and end face 38.

The input shaft 12 is secured to a hollow stepped cylinder terminating in a plate 44. It is centered in bore 30 via a surface 46, and bears on bearing 36 via the left surface of plate 44 (see FIG. 3).

Plate 44 is the first component of a face distributor 48 which varies the fluid pressures in the compartments defined in the inner cavity of casing 18 by a rotor 50 connected to the output shaft 14 by grooves 52. A disc 54 secured to rotor 50 by two pins 56 constitutes the second component of the face distributor.

Figure 3:
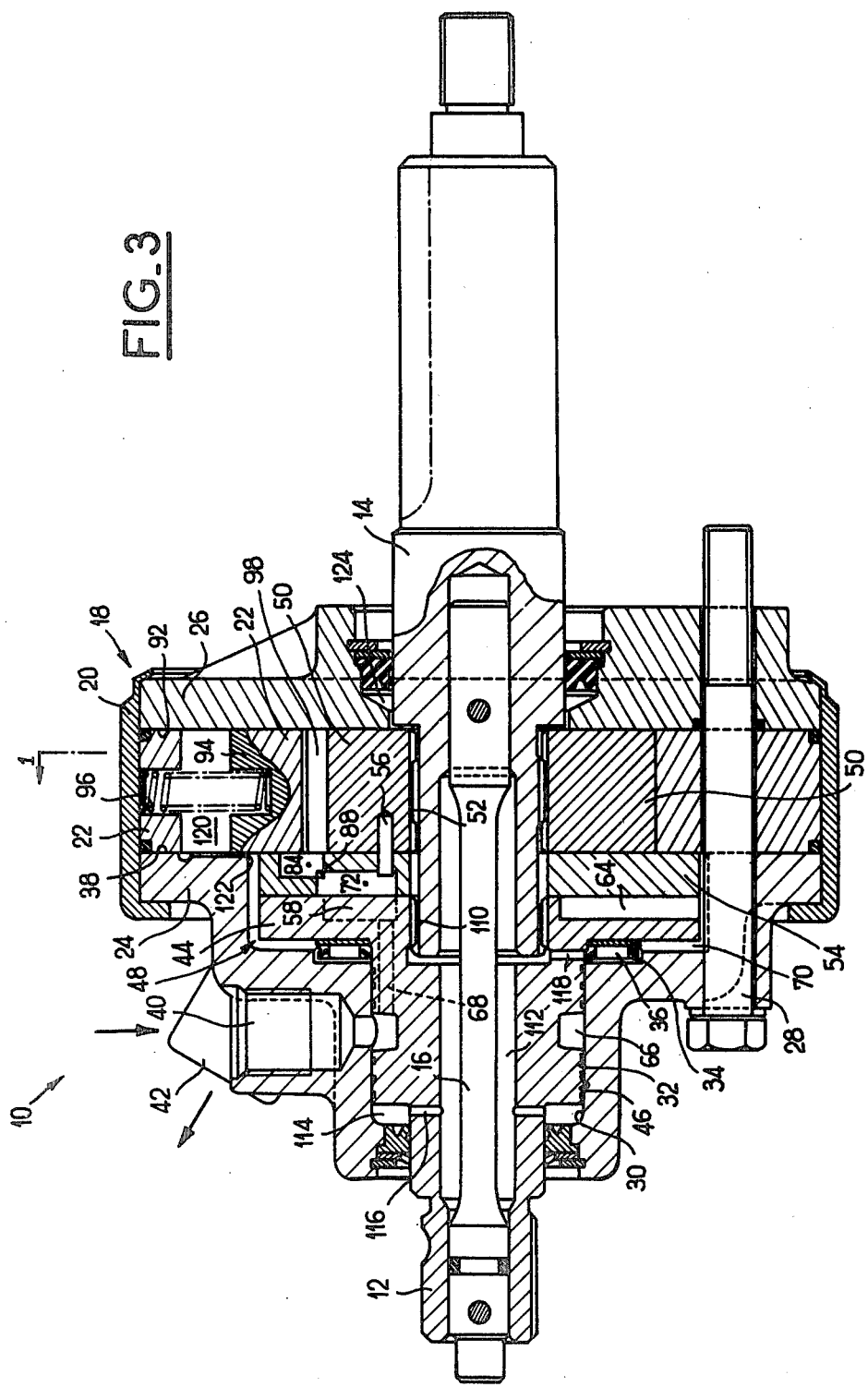
FIG. 3 is a view in longitudinal section of the hydraulic servo-mechanism along 3—3 in FIG. 1.
Figure 4:
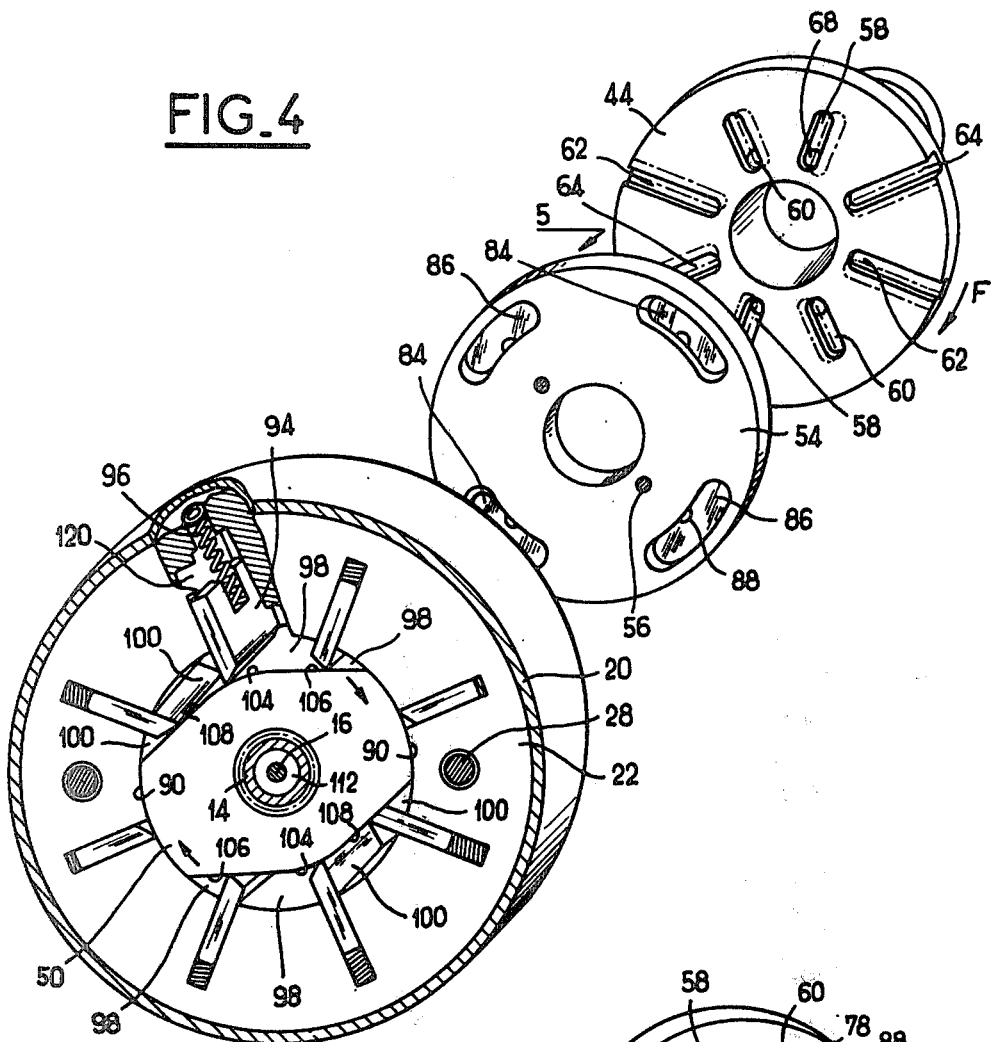
FIG. 4 is an exploded perspective view of the main components of the hydraulic servo-mechanism.

In the embodiment shown, plate 44 has eight radial grooves which do not extend through it but open towards the right in FIG. 3. Four grooves define supply chambers 58, 60 and the other four define exhaust chambers 62, 64 (as shown in FIG. 4). The supply chambers 58, 60 are connected to the constant flow-rate source of fluid by orifice 40, a groove 66 in surface 46, and axial passages 68 formed in the input shaft 12. The exhaust chambers 62 and 64, which have an end which opens on to the peripheral surface of plate 44, communicate with the tank of the constant flowrate source of fluid via orifice 42 and an annular chamber 70 disposed between the first shell 24 and the peripheral surface of plate 44.

Disc 54 and plate 44 cooperate in sealing-tight manner in order to substantially eliminate any leaks.

Figure 5:
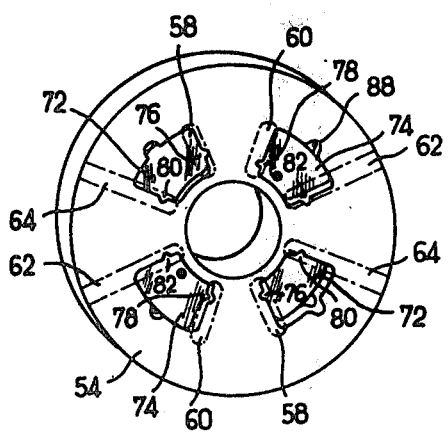
FIG. 5 is a perspective view of one of the components, in the direction of arrow 5 in FIG. 4.

Four circular sectors defining four intermediate identical equidistant chambers 72, 74 are formed in the left surface of disc 54 but do not extend through it (see FIG. 5). Each intermediate chamber communicates with one of the four supply chambers 58 or 60 via a first variable overlap aperture 76 or 78, and with one of the four exhaust chambers 64, 62 via a second variable overlap aperture 80 or 82, the apertures each being defined by the adjacent radial edges of the corresponding chambers.

Consequently, the circuit of the open-centre distribution system starting from the source of fluid at a constant flow rate comprises orifice 40, groove 66, four axial passages 68, four supply chambers 58 or 60, four first apertures 76 or 78, four intermediate chambers 72 or 74, four second apertures 80 or 82, four exhaust chambers 62 or 64, the annular chamber 70 and the orifice 42 connected to the tank of the source of fluid at a constant flow rate.

Figure 2:
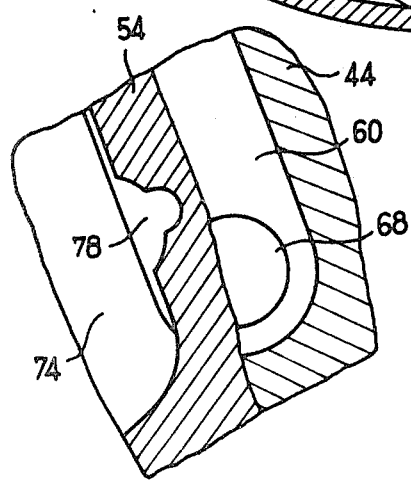
FIG. 2 is an enlarged view of a detail of the cut-away partial view in FIG. 1.

The supply chambers 58, 60 and the exhaust chambers 62, 64 comprise radial grooves and have straight radial edges. On the other hand, the radial edges of the intermediate chambers 72, 74 comprise a lateral prolongation formed by a portion of cylinder prolonged by a portion of cylinder having a smaller radius (as shown in FIG. 2). Consequently, the cross-sections of the first and second overlapping apertures 76, 78, 80 and 82 vary in very gradual manner as a function of the relative position of disc 54 and plate 44, thus modulating the pressures in the intermediate chambers 72 and 74 as a function of the input order applied by the operator to shaft 12.

Four identical, equidistant crescent-shaped recesses defining four flow chambers 84, 86 are also formed in the right surface (in FIG. 3) of disc 54 but do not extend through it. Each intermediate chamber 72 or 74 communicates with a flow chamber 84 or 86 via a passage 88.

Rotor 50 rotates in sealing-tight manner in ring 22 via two diametrically opposite surfaces 90 which cooperate to bound two compartments. It also bears in sealing-tight manner on disc 54 and on the end face 92 of the second shell 26, in order to substantially eliminate any leaks.

Ring 22 has eight angularly equidistant vanes 94 which slide radially in recesses. The lateral surfaces of vanes 94 slide on (a) disc 54 and end face 38 and (b) face 92. Springs 96 bear on the inner surface of collar 20 and urge vanes 94 towards the peripheral surface of rotor 50.

When rotor 50 occupies a given position relative to ring 22, two vanes 94 each cooperate with one of the two surfaces 90 (which in this embodiment have an arc equal to that limited by two adjacent vanes), whereas the other six vanes 94 form sets of three dividing each of the two compartments into four chambers 98 and 100 (see bottom part of FIG. 1).

The two adjacent chambers 100 are connected by a flow chamber 86 and a passage 88 to an intermediate chamber 74. Consequently, there is the same pressure in the two intermediate chambers 74, the two adjacent chambers 100, and the diametrically opposite chambers 100.

When rotor 50 is in a given position relative to ring 22 (see top of FIG. 1), four vanes 94 cooperate in pairs with the two surfaces 90 whereas the other four vanes 94 in pairs divide each of the two compartments into three chambers 98, 100, 102 extending around an equal arc on ring 22.

As before, the pressure is the same in the two intermediate chambers 72 and in the two diametrically opposite end chambers 98, and there is the same pressure in the two intermediate chambers 74 as in the two diametrically opposite end chambers 100. On the other hand, the two diametrically opposite central chambers 102 are called "neutral" chambers, with an intermediate pressure prevailing therein.

The two peripheral surface portions of rotor 50 between surfaces 90 comprise a cylindrical portion 104 which is equidistant from surfaces 90 and occupies an arc equal to that bounded by two adjacent vanes and is connected to each surface 90 by a substantially flat surface 106 or 108, one end of which is at a tangent to the cylindrical portion 104 and the other end of which joins surface 90 via a slightly rounded portion. Alternately, the connecting surfaces or "facets" can be slightly curved, either convex or concave.

As a result, the forces due to the pressures near the two cylindrical portions 104 do not exert any torque on rotor 50, since the directions of the force meet the axis of the rotor. The torque on rotor 50 is due only to the forces developed by the pressures near the four flat surfaces 106 and 108.

The surfaces in contact between vanes 94 and the peripheral surfaces of rotor 50 are designed to be negligible compared with the surfaces of facets 106 and 108.

Consequently, irrespective of the position of rotor 50 relative to ring 22, the pressure near the two diametrically opposite flat surfaces 106 is the same as in chambers 98 and consequently in the two intermediate chambers 72; and the pressure near the two diametrically opposite flat surfaces 108 is the same as in chambers 100 and consequently in the two intermediate chambers 74.

Consequently, when the supply pressure is constant, the torque exerted on rotor 50 is constant and, more particularly, independent of the position of rotor 50 relative to ring 22. On the other hand, the torque depends on the pressures in the intermediate chambers 72, 74, which vary with the flow section offered by apertures 76, 78, 80, 82 as a function of the input order applied to shaft 12.

Output shaft 14 has a hollow cylindrical end which extends into the second shell 26. Cooperating grooves 110 at the end of input shaft 12 and the end of outlet shaft 14 abut one another after exceeding a slight angular clearance (e.g. 7°) between shaft 12 and shaft 14, which happens if the servo-mechanism fails or if the wheel is turned very sharply, in which case the operator can take control directly.

The inner chamber 112 common to shaft 12 and shaft 14 communicates via radial passages 116 with the chamber 114 between shaft 12 and the first shell 24; via radial passages 118 with the annular chamber 70 connected to the tank of the source of constant-flow liquid; via leak passages 122 with the chambers 120 of springs 96; and via grooves 110 and 52 with the chamber 124 between shaft 14 and the second shell 26, so that the pressure of the tank of the source of constant-flow fluid is established around the input shaft 12 and around the outlet shaft 14, thus preventing any interferring thrust.

The aforementioned hydraulic servo-mechanism operates as follows:

Broken lines in FIGS. 4 and 5 illustrate the relative positions of the chambers when the driver wishes to turn the vehicle wheels towards the left, along arrow F in FIGS. 1 and 4.

When the driver wishes to turn the wheels to the left, he rotates the steering wheel over to the left, thus pivoting the input shaft 12 through a certain angle towards the left. The torsion bar 16 is deformed and plate 44 is shifted through an angle towards the left relative to disc 54.

There is an increase in the flow sections offered by the first apertures 76 and the second apertures 82, whereas there is a decrease in the flow sections offered by the first apertures 78 and the second apertures 80 (as shown in FIGS. 4 and 5). This results in an increase in pressure in the intermediate chambers 72, since the flow sections of apertures 76 to the supply chambers 58 are greater than the flow sections of the apertures 80 to the exhaust chambers 64; there is also a drop in pressure in the intermediate chambers 74, since the flow sections of apertures 78 to the supply chambers 60 are smaller than the flow sections of apertures 82 to the exhaust chambers 62.

Thus, the pressure in chambers 98 near facets 106 is greater than the pressure in chambers 100 near facets 108. A constant torque is exerted on rotor 50, which, via grooves 52, drives output shaft 14 towards the left.

If the conductor exerts a higher torque on the steering wheel towards the left, there is an increase in the flow sections of apertures 76 and 82 and a further decrease in the flow sections of apertures 78 and 80; the difference between the pressure near facets 106 and the pressure near facets 108 is greater and consequently there is a higher torque driving the output shaft 14.

When the driver stops exerting a torque on the wheel, the torsion bar 16 eliminates the angular offset of plate 44 towards the left relative to disc 54. The flow sections of apertures 76, 78, 80 and 82 become equal, and consequently the pressures in chambers 98 and 100 become equal and no further torque is exerted on rotor 50.

When the driver wishes to turn the vehicle to the right, the hydraulic servo-mechanism operates in similar though reverse manner. There is an increase in the flow sections of apertures 78 and 80 and a decrease in the flow sections of apertures 76 and 82; the pressure in the intermediate chambers 72 and consequently in chambers 98 becomes less than the pressure in the intermediate chambers 74 and consequently in chambers 100, and a torque is exerted on rotor 50 and drives the output shaft 14 to the right.

The torsion bar 16, which is a resilient coupling, subjects the input shaft to a counter-torque, thus showing the driver that the desired manoeuvre has been carried out.

If the hydraulic servo-mechanism fails, grooves 110 make up the angular clearance, after which the input shaft 12 can directly drive the output shaft 14, so that the driver can turn the vehicle wheels without assistance.

I claim:

1. A torque-amplifying hydraulic servo-mechanism, particularly for power steering systems in motor vehicles, of the kind including a rotary hydraulic motor and a hydraulic distributor mounted coaxially within a common closed casing, an input shaft connected to a component of the hydraulic distributor, an output shaft connected to the rotary component of the hydraulic motor, and a resilient coupling disposed between the shafts in order to produce a feedback torque on the input shaft so as to indicate the amplified torque delivered to the output shaft, the hydraulic distributor being of the "open centre" kind and controlling the distribution of pressure fluid in the working chambers of the hydraulic motor so as to actuate it in one or the other direction when, and depending on the direction in which, the input shaft is moved through an angle with respect to the output shaft, and the hydraulic motor being of the sliding vane type and comprising two coaxial components namely a stator of cylindrical shape which bears angularly equidistant radially sliding vanes and a rotor whose non-circular shape is designed so as to define with said stator and said vanes a number of variable volume working chambers, characterized in that the shape of the rotor (50) of the hydraulic motor comprises at least two angularly equidistant cylindrical surfaces (90) in contact with the stator bore and each extending over an arc substantially equal to that between two adjacent vanes, these surfaces being interconnected by portions of contour each having two flat or slightly curved faces (106, 108) interconnected by a cylindrical surface portion (104) and bounding a corresponding number of separate compartments with the stator bore, and in that the number of vanes (94) is four times the number of said surfaces (90) and portions of rotor contour so as to subdivide each compartment, depending on the position of the rotor, either into four working chambers (98, 98, 100, 100) the first two of which can be supplied with high-pressure fluid and the last two with low-pressure fluid or vice versa by actuating the distributor, or into three working chambers (98, 102, 100) the first of which can be supplied with high-pressure fluid and the last with low-pressure fluid or vice versa by operating the distributor, whereas the central chamber (102) is at an intermediate pressure.

2. A hydraulic servo-mechanism according to claim 1, characterized in that the cylindrical surface portion (104) interconnecting the faces (106, 108) on the rotor contour extends over an arc substantially equal to that between two adjacent vanes.

3. A hydraulic servo-mechanism according to claim 1 or 2, and wherein the hydraulic distributor is of the "face" kind and comprises a plate rotating integrally with the input shaft and having a number of supply chambers on its active surface, said number of supply chambers being twice the number of rotor surfaces and the chambers being connected to a source of fluid at a substantially constant flow rate, and an identical number of exhaust chambers connected to the return of the source and alternating with the supply chambers, and further comprises a disc secured to the rotor of the hydraulic motor and disposed between and continuous with the latter and the aforementioned plate, the surface of the disc adjacent the plate being provided with an equal number of symmetrically distributed intermediate chambers each communicating by variable partial overlap with a supply chamber and an exhaust chamber of the plate, characterized in that the disc surface adjacent the rotor bears a similar number of angularly equidistant flow chambers (84, 86) each connected to one of the intermediate chambers (72, 74) and opening into the hydraulic motor substantially at the level of the aforementioned compartments in order to supply them with fluid under pressure.

4. A hydraulic servo-mechanism according to claim 3, characterized in that the flow chambers (84, 86) are substantially crescent-shaped and are formed in the surface of the disc (54) adjacent the rotor and each connected by a passage (88) to one of the intermediate chambers, the average diameter of the crescent-shaped chambers being substantially equal to the diameter of the stator bore of the hydraulic motor.

5. A hydraulic servo-mechanism according to claim 3 wherein the supply chambers comprise radial grooves formed in the plate and opening only on to its active surface, the exhaust chambers comprise radial grooves also formed in the plate and opening both on to its active surface and its periphery, and the intermediate chambers comprise substantially circular sectors formed in a surface of the disc, the radial edges of which cooperate with two of the aforementioned grooves to bound the variable overlapping apertures, characterized in that each radial edge of the intermediate chambers (72, 74) is laterally prolonged by a cylinder portion (76, 78) which in turn is prolonged by a cylinder portion having a smaller radius, so that the flow section offered to the fluid at the overlaps varies progressively as a function of the relative angular position of the plate (44) and the disc (54), so that the output torque can be progressively varied as a function of the input torque.

6. A hydraulic servo-mechanism according to claim 4 wherein the supply chambers comprise radial grooves formed in the plate and opening only on to its active surface, the exhaust chambers comprise radial grooves also formed in the plate and opening both on to its active surface and its periphery, and the intermediate chambers comprise substantially circular sectors formed in a surface of the disc, the radial edges of which cooperate with two of the aforementioned grooves to bound the variable overlapping apertures, characterized in that each radial edge of the intermediate chambers (72, 74) is laterally prolonged by a cylinder portion (76, 78) which in turn is prolonged by a cylinder portion having a smaller radius, so that the flow section offered to the fluid at the overlaps varies progressively as a function of the relative angular position of the plate (44) and the disc (54), so that the output torque can be progressively varied as a function of the input torque.

* * * * *